(12) United States Patent
Matsukawa

(10) Patent No.: US 10,436,286 B2
(45) Date of Patent: Oct. 8, 2019

(54) COGGED V-BELT AND TRANSMISSION SYSTEM USING SAME

(71) Applicant: BANDO CHEMICAL INDUSTRIES, LTD., Kobe-shi, Hyogo (JP)

(72) Inventor: Hirokazu Matsukawa, Kobe (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/195,663

(22) Filed: Nov. 19, 2018

(65) Prior Publication Data

US 2019/0085939 A1    Mar. 21, 2019

Related U.S. Application Data

(63) Continuation of application No. PCT/JP2017/018699, filed on May 18, 2017.

(30) Foreign Application Priority Data

May 20, 2016   (JP) .................... 2016-101619

(51) Int. Cl.
| | |
|---|---|
| *F16G 5/20* | (2006.01) |
| *B32B 3/26* | (2006.01) |
| *B32B 7/12* | (2006.01) |
| *F16G 5/08* | (2006.01) |
| *F16H 7/02* | (2006.01) |

(52) U.S. Cl.
CPC ............... *F16G 5/20* (2013.01); *B32B 3/263* (2013.01); *B32B 7/12* (2013.01); *F16G 5/08* (2013.01); *F16H 7/023* (2013.01); *B32B 2433/04* (2013.01)

(58) Field of Classification Search
CPC ..... F16G 5/20; F16G 1/28; F16G 5/06; F16G 5/08; F16H 7/023
USPC ............................................. 474/205
See application file for complete search history.

(56) References Cited

U.S. PATENT DOCUMENTS

| | | | | |
|---|---|---|---|---|
| 2,430,500 A | * | 11/1947 | Freedlander | F16G 5/20 428/114 |
| 2,514,429 A | * | 7/1950 | Waugh | F16G 1/28 198/690.2 |
| 3,756,091 A | * | 9/1973 | Miller | B62D 55/12 474/153 |
| 3,968,703 A | * | 7/1976 | Bellmann | B29D 29/10 474/250 |
| 4,041,789 A | * | 8/1977 | Hoback | F16G 1/28 474/148 |

(Continued)

FOREIGN PATENT DOCUMENTS

| | | |
|---|---|---|
| CN | 103890449 A | 6/2014 |
| CN | 105190089 A | 12/2015 |

(Continued)

*Primary Examiner* — Henry Y Liu
(74) *Attorney, Agent, or Firm* — Maschoff Brennan

(57) ABSTRACT

An inner peripheral surface of a belt is cogged so that cogs extend in a belt width direction and are arranged adjacent to one another at regular intervals in a belt length direction. A tip portion of the cog and a bottom portion of a groove formed between the cogs have curved surfaces each having an arc-shaped cross section. A curvature radius of a cross-sectional shape of the bottom portion of the groove is set to be larger than a curvature radius of a cross-sectional shape of the tip portion of the cog.

4 Claims, 5 Drawing Sheets

(56) References Cited

U.S. PATENT DOCUMENTS

| | | | | |
|---|---|---|---|---|
| 4,228,692 A * | 10/1980 | Jacob | F16G 5/08 | 156/139 |
| 4,233,852 A * | 11/1980 | Bruns | F16H 55/171 | 474/153 |
| 4,264,314 A * | 4/1981 | Imamura | F16G 5/20 | 474/205 |
| 4,276,039 A * | 6/1981 | Takano | B29D 29/085 | 474/205 |
| 4,295,837 A * | 10/1981 | Marsh | F16H 7/023 | 29/892 |
| 4,305,714 A * | 12/1981 | Renshaw | B29D 29/106 | 474/250 |
| 4,337,056 A * | 6/1982 | Bruns | F16G 1/28 | 474/153 |
| 4,403,979 A * | 9/1983 | Wujick | F16H 55/171 | 474/153 |
| 4,409,047 A * | 10/1983 | Brooks | B29D 29/106 | 156/138 |
| 4,443,280 A * | 4/1984 | Standley | F16G 5/08 | 156/137 |
| 4,494,947 A * | 1/1985 | Miranti, Jr. | F16G 5/00 | 474/251 |
| 4,553,952 A * | 11/1985 | Tangorra | F16H 7/023 | 474/153 |
| 4,559,029 A * | 12/1985 | Miranti, Jr. | F16G 5/00 | 474/205 |
| 4,571,230 A * | 2/1986 | Woodland | F16G 5/20 | 474/263 |
| 4,604,080 A * | 8/1986 | Mizuno | F16H 7/023 | 474/153 |
| 4,708,703 A * | 11/1987 | Macchiarulo | F16G 5/20 | 474/263 |
| 4,722,721 A * | 2/1988 | Wetzel | F16G 1/28 | 474/153 |
| 4,894,048 A * | 1/1990 | Inukai | F16G 5/166 | 474/201 |
| 5,102,374 A * | 4/1992 | Macchiarulo | F16H 7/023 | 474/153 |
| 5,346,439 A * | 9/1994 | Lynch | F16G 1/28 | 474/205 |
| 5,405,299 A * | 4/1995 | Kubo | F16G 1/28 | 474/205 |
| 5,521,007 A * | 5/1996 | Kurokawa | D02G 3/26 | 152/451 |
| 5,860,883 A * | 1/1999 | Jonen | C08K 5/098 | 474/205 |
| 5,971,879 A * | 10/1999 | Westhoff | B32B 5/26 | 442/35 |
| 6,117,035 A * | 9/2000 | Isshiki | F16G 1/28 | 474/204 |
| 6,485,384 B1 * | 11/2002 | Ochiai | B41J 19/005 | 474/153 |
| 6,491,598 B1 * | 12/2002 | Rosenboom | B32B 25/14 | 474/260 |
| 6,575,862 B2 * | 6/2003 | Miyaji | F16G 1/28 | 474/153 |
| 6,605,014 B2 * | 8/2003 | Isshiki | F16G 1/28 | 428/172 |
| 6,620,068 B2 * | 9/2003 | Ito | B29D 29/085 | 474/205 |
| 7,144,345 B2 * | 12/2006 | Edamatsu | F16G 1/28 | 474/205 |
| 7,435,198 B2 * | 10/2008 | Tomobuchi | F16G 1/28 | 428/421 |
| 7,841,463 B2 * | 11/2010 | DeGroot | B65G 15/42 | 198/832 |
| 8,002,922 B2 * | 8/2011 | Onita | F16G 5/20 | 156/137 |
| 8,057,344 B2 * | 11/2011 | Wu | F16G 1/28 | 474/205 |
| 8,070,634 B2 * | 12/2011 | Gaynor | F16H 55/171 | 474/153 |
| 8,206,251 B2 * | 6/2012 | Fan | F16G 5/20 | 474/205 |
| 8,672,788 B2 * | 3/2014 | Duke | B29D 29/08 | 474/260 |
| 2002/0187869 A1 * | 12/2002 | Martin | B29D 29/08 | 474/260 |
| 2005/0043486 A1 * | 2/2005 | Okuno | C08K 5/01 | 525/193 |
| 2005/0239585 A1 * | 10/2005 | Nishida | F16H 9/18 | 474/19 |
| 2006/0105873 A1 * | 5/2006 | Sato | F16G 5/06 | 474/263 |
| 2009/0011883 A1 * | 1/2009 | Wu | D01F 6/62 | 474/205 |
| 2010/0004084 A1 * | 1/2010 | Fan | F16G 5/20 | 474/242 |
| 2010/0279808 A1 * | 11/2010 | Fan | F16G 5/20 | 474/205 |
| 2011/0070989 A1 * | 3/2011 | Duke | B29D 29/08 | 474/260 |
| 2013/0190120 A1 * | 7/2013 | Fan | F16G 5/06 | 474/205 |
| 2015/0111677 A1 * | 4/2015 | Nishiyama | F16G 1/10 | 474/264 |
| 2015/0141186 A1 * | 5/2015 | Noguchi | F16G 5/20 | 474/205 |
| 2016/0040749 A1 * | 2/2016 | Kageyama | B32B 25/10 | 474/8 |
| 2016/0298725 A1 | 10/2016 | Ishiguro et al. | | |

FOREIGN PATENT DOCUMENTS

| | | |
|---|---|---|
| JP | 59-158743 U | 10/1984 |
| JP | 2-146253 U | 12/1990 |
| JP | 2014-70644 A | 4/2014 |

* cited by examiner

COGGED V-BELT AND TRANSMISSION SYSTEM USING SAME

CROSS-REFERENCE TO RELATED APPLICATIONS

This is a continuation of International Application No. PCT/JP2017/018699 filed on May 18, 2017, which claims priority to Japanese Patent Application No. 2016-101619 filed on May 20, 2016. The entire disclosures of these applications are incorporated by reference herein.

BACKGROUND

The present invention relates to a cogged V-belt and a power transmission system using the cogged V-belt.

In a belt power transmission system, a cogged V-belt has been widely known as a power transmission belt for transmitting power between pulleys. In such a cogged V-belt, the inner or outer peripheral surface is cogged so as to have a plurality of cogs arranged adjacent to one another in the belt length direction. The cogged V-belt has an increased thickness, which is advantageous in maintaining rigidity against the lateral pressure applied to the belt by the pulleys while achieving good bendability of the belt, and various techniques have been disclosed so far (e.g., Japanese Unexamined Patent Publication No. 2014-70644).

SUMMARY

However, in a case where the cogged V-belt is used for a power transmission system of a large machine, such as a farm machine, the belt size needs to be increased to maintain the rigidity of the belt, which inevitably decreases the bendability of the belt and causes difficulty in attaching the belt to a small-diameter pulley.

It is therefore an object of the present invention to make an improvement in the shape of a cogged V-belt for use, for example, in a power transmission system for a large machine, thereby increasing the bendability of the belt while maintaining the rigidity of the belt.

To achieve the above object, the present invention focuses on a groove of a belt formed between cogs, and sets a curvature radius of a cross-sectional shape of a bottom portion of the groove to be larger than a curvature radius of a cross-sectional shape of a tip portion of each cog, to increase the bendability of the belt.

Specifically, the first aspect of the invention is directed to a cogged V-belt, at least one of an inner peripheral surface or an outer peripheral surface of which is cogged to have a plurality of cogs extending in a belt width direction and arranged adjacent to one another at regular intervals in a belt length direction. A groove is formed between the cogs adjacent to each other, the groove being recessed in an opposite direction to a protruding direction of the cogs. A tip portion in the protruding direction of the cog and a bottom portion of the groove have curved surfaces each having an arc-shaped cross section. A curvature radius of a cross-sectional shape of the bottom portion of the groove is larger than a curvature radius of a cross-sectional shape of the tip portion of the cog.

In the above configuration, the curvature radius of the cross sectional shape of the bottom portion of the groove formed between the cogs is larger than the curvature radius of the cross sectional shape of the tip portion of the cog. The belt can thus be bent easily. These cogs allow the belt to have an increased thickness, thereby ensuring the belt rigidity against the lateral pressure applied to the belt, and can also increase the bendability of the belt.

A second aspect of the present invention is an embodiment of the first aspect. In the second aspect, the tip portions of the cogs are connected with the bottom portion of the groove between the cogs via planar surfaces located between the respective tip portions of the cogs and the bottom portion of the groove, and an intersection angle between the planar surfaces on both sides of the groove is 20° or more and 30° or less.

These configurations allow the belt to have a deeper groove between the cogs by the length of each planar surface than in a case where the belt has cogs and grooves having only curved surfaces. As a result, the bendability of the belt can be further increased.

A third aspect of the present invention is an embodiment of the first or second aspect. In the third aspect, each of the cogs is formed so as to be plane-symmetrical to a symmetry plane that is perpendicular to the belt length direction and passes through a middle portion in a thickness direction of the cog.

Due to this configuration, the running direction of the belt is not limited to one of the two opposite directions along the belt length, allowing the belt to be used in a power transmission system in which the belt runs in both of the two opposite directions along the belt length.

A fourth aspect of the present invention is directed to a power transmission system in which the cogged V-belt of any one of the first to third aspects is wrapped around a plurality of pulleys.

According to the above configuration, the cogs of the cogged V-belt allow the belt to have an increased thickness, thereby ensuring the belt rigidity against the lateral pressure applied to the belt, and can also increase the bendability of the belt.

According to the present invention, a bottom portion of a groove formed between cogs and a tip portion of each cog have curved surfaces each having an arc-shaped cross section, and a curvature radius of a cross sectional shape of the bottom portion of the groove is set to be larger than a curvature radius of a cross sectional shape of the tip portion of the cog. These configurations can increase the bendability of the cogged V-belt while ensuring the belt rigidity, thereby making it possible to obtain a cogged V-belt suitable for use in a power transmission system such as a large farm machine.

DETAILED DESCRIPTION

One or more embodiments will be described in detail below, with reference to the drawings. Note that the following description of the embodiments is merely an example in nature, and is not intended to limit the scope, application, or uses of one or more embodiments.

First Embodiment

Figure 1:
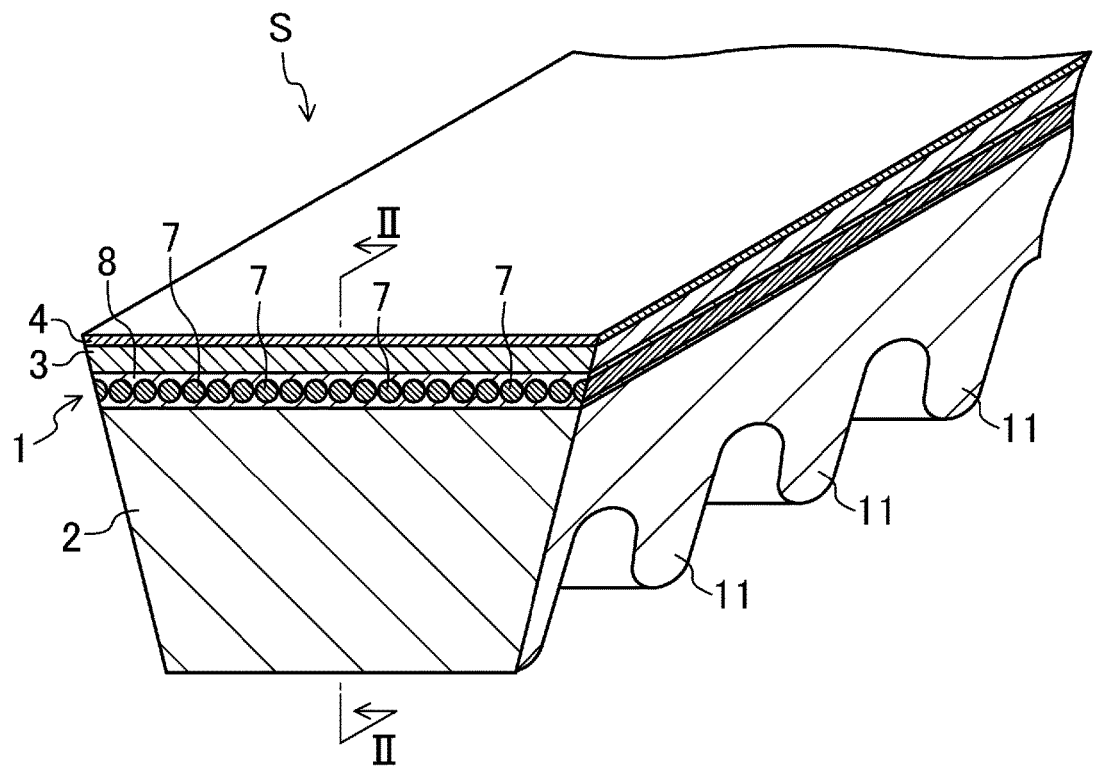
FIG. 1 is a perspective view illustrating part of a cogged V-belt according to a first embodiment.

FIG. 1 illustrates a cogged V-belt S according to a first embodiment. The belt S is an endless belt forming a closed loop, and is used, for example, for a power transmission system of a large machine. The belt S includes a cord buried portion 1 in which a cord 7 extending in a belt longitudinal direction is buried, a compressed portion 2 integrally formed with an inner peripheral surface (a lower surface in FIG. 1) of the cord buried portion 1, and an extension portion 3 formed on an outer peripheral surface (an upper surface in FIG. 1) of the cord buried portion 1. Canvas 4 is layered integrally on an outer peripheral surface of the extension portion 3.

The belt S is configured such that the cross section thereof taken along a plane perpendicular to the belt longitudinal direction has a trapezoidal shape, and the length in the belt width direction of the cross section decreases from the outer peripheral surface toward the inner peripheral surface of the belt.

The cord buried portion 1 is comprised of an adhesive rubber layer 8 made of a rubber composition, and cords 7, 7, . . . , made of twisted fibers, which are buried in the adhesive rubber layer 8 so as to be arranged adjacent to one another in the belt width direction and form a helical pattern.

Examples of a rubber component of the rubber composition which makes the adhesive rubber layer 8 include chloroprene rubber (CR), ethylene-propylene-diene terpolymer rubber (EPDM), and so on. The cord 7 may be produced by immersing twisted yarn made of such as polyester (PET) fibers in a resorcinol/formalin/latex aqueous solution or the like, and drying the twisted yarn.

The extension portion 3 is made of a rubber composition in which short fibers are added and dispersed so as to be oriented in the belt width direction. Examples of a rubber component of the rubber composition which makes the extension portion 3 include chloroprene rubber (CR), ethylene-propylene-diene terpolymer rubber (EPDM), and so on.

The canvas 4 can be produced by giving an adhesion treatment to extensible woven fabric made of nylon fibers, cotton, aramid fibers, a blend of these fibers, or the like, which are immersed in rubber cement and dried thereafter.

The compressed portion 2 is made of a rubber composition in which short fibers are added and dispersed so as to be oriented in the belt width direction. Examples of a rubber component of the rubber composition which makes the compressed portion 2 include chloroprene rubber (CR), ethylene-propylene-diene terpolymer rubber (EPDM), and so on.

The compressed portion 2 includes a plurality of cogs 11, 11, . . . , which are linearly extending ridges extending in the belt width direction and protruding toward the belt inner peripheral side, and are arranged adjacent to one another at regular pitches (intervals) in the belt length direction. Each cog 11 is formed so as to be plane-symmetrical to a symmetry plane 16 that is perpendicular to the belt length direction and passes through a middle portion in the thickness direction of the cog 11.

Figure 2:
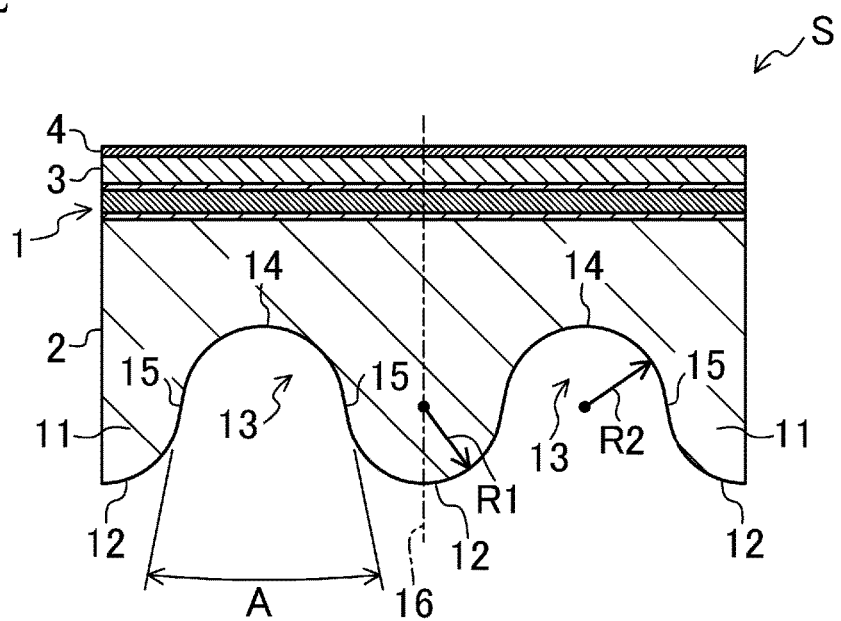
FIG. 2 is a cross-sectional view taken along the line II-II of FIG. 1.

As illustrated in FIG. 2, a groove 13 is formed between adjacent cogs 11 and 11. The groove 13 is a linearly extending indentation recessed in an opposite direction to the protruding direction of the cog 11. Both of a tip portion 12 in the protruding direction of each cog 11 and a bottom portion 14 of each groove 13 have curved surfaces each having an arc-shaped cross section. A curvature radius R2 of a cross-sectional shape of the bottom portion 14 of the groove is set to be larger than a curvature radius R1 of a cross-sectional shape of the tip portion 12 of the cog (that is, R1<R2).

Further, a portion between the tip portion 12 of a cog 11 and the bottom portion 14 of the groove 13 adjacent to the cog 11 has a planar surface 15. That is, the curved surface of the tip portion 12 of the cog 11 and the curved surface of the bottom portion 14 of the groove 13 are smoothly connected via the planar surface 15 located between the curved surfaces. An intersection angle A formed between the planar surfaces 15 and 15 on both sides of the groove 13 (both sides in the belt length direction) is set to be 20° or more and 30° or less (20°≤A≤30°). The intersection angle A in the shown example is 27°, for example. The intersection angle A is preferably 20° or more and 30° or less because if the intersection angle A is less than 20°, it is difficult to form the cogs 11, 11, . . . , while maintaining the relationship of R1<R2, and if the intersection angle A is greater than 30°, the rigidity of the belt against the lateral pressure significantly decreases.

Now, a power transmission system V using the belt S of the present embodiment will be described based on FIGS. 3 and 4.

Figure 3:
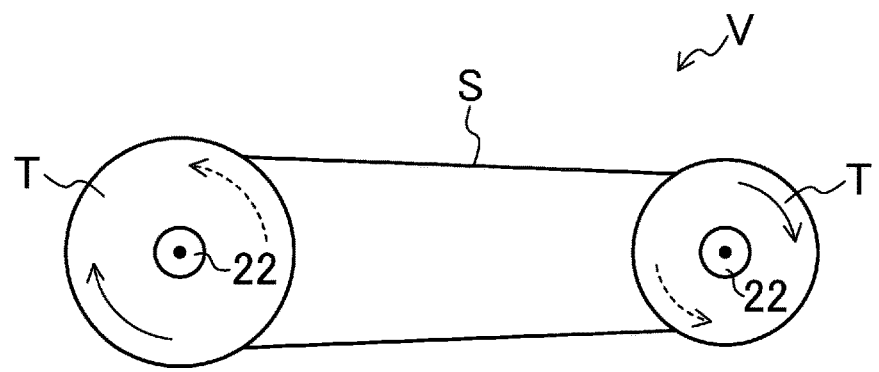
FIG. 3 is a front view schematically illustrating a power transmission system using the cogged V-belt.

As illustrated in FIG. 3, the power transmission system V is comprised of two pulleys T and T, which are V-shaped pulleys, arranged apart from each other and rotatable about rotational axes 22 and 22, and of the belt S of the present embodiment wrapped around the two pulleys T and T. The power of one pulley T (e.g., the right pulley of FIG. 3) is transmitted to the other pulley T via the belt S. The pulleys T and T may rotate not only in the forward direction (the direction indicated by solid arrows in FIG. 3), but also in the reverse direction (the direction indicated by dotted arrows in FIG. 3) to transmit power via the belt S.

Figure 4:
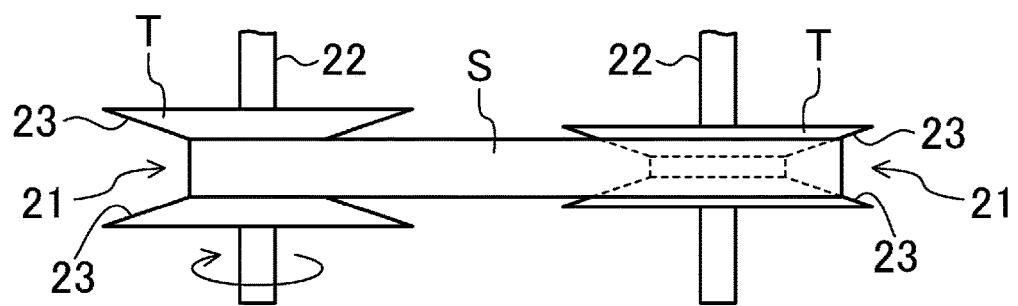
FIG. 4 illustrates a plan view of the system of FIG. 3.

As illustrated in FIG. 4, each pulley T has a pulley groove 21 (a V-shaped groove) which is a recess having a V-shaped cross section. The belt S having a V-shaped cross section is wrapped around the pulley T so as to be fitted in this pulley groove 21. Rotation of a drive pulley T (one of the pulleys T) causes the belt S to wedge into the pulley groove 21 of the drive pulley T, which applies predetermined tension to the belt S, making the belt S run along the rotational direction of the drive pulley T. The running of the belt S causes the belt S to wedge into the pulley groove 21 of a driven pulley T (the other pulley T), making the driven pulley T run in the same direction. At this moment, the belt S is strained in a direction of the tension applied and is also pushed toward the centers of the pulleys T and T and against the pulley grooves 21, resulting in receiving pressure from sidewalls 23 of the pulley grooves 21 as a reaction force from the pulley grooves 21.

The cogs 11, 11, ..., forming the inner peripheral surface of the belt S contribute to an increase in the area which receives the pressure from the sidewalls 23 of the pulley grooves 21, making it possible to ensure the belt rigidity against such pressure. In addition, the greater curvature radius R2 of the cross sectional shape of the bottom portion 14 of the groove 13 located between the cogs 11 and 11 than the curvature radius R1 of the cross sectional shape of the tip portion 12 of the cog 11 contributes to the increased bendability of the belt S, which allows the belt S to be bent and wrapped easily around the pulleys T and T.

Moreover, the cog 11 with the planar surfaces 15 each located between and connecting the tip portion 12 of the cog 11 and the bottom portion 12 of the groove 13 adjacent to the cog 11 can have a greater height, and can thus provide greater bendability of the belt S, than the cog 11 without such planar surfaces 15 in which the curved surfaces of the tip portion 12 of the cog 11 and the bottom portion 14 of the groove 13 are connected directly. In such a cog 11, the intersection angle between the planar surfaces 15 and 15 on both sides of the groove 13 is 20° or more and 30° or less. The rigidity of the belt S against the lateral pressure can thus be well ensured.

According to the present embodiment, the cogs 11, 11, ..., forming the inner peripheral surface of the belt S are configured such that the curvature radius R2 of the cross sectional shape of the bottom portion 14 of the groove 13 located between the cogs 11 and 11 is larger than the curvature radius R1 of the cross sectional shape of the tip portion 12 of the cog 11. Such cogs 11, 11, ..., contribute to an increase in the bendability of the belt S while ensuring the rigidity of the belt S against the pressure from the sidewalls 23 of the pulley groove 21 of the pulley T, thereby reducing the bending resistance of the belt S. The smaller bending resistance is advantageous in reducing bending fatigue of the belt S, that is, less heat is generated in the belt S, and the belt lifetime can be extended.

Further, each cog 11 is formed so as to be plane-symmetrical to the symmetry plane 16 that is perpendicular to the belt length direction and passes through the middle portion in the thickness direction of the cog 11. Due to this configuration, the running direction of the belt S is not limited to one direction, allowing the belt S to be used in a power transmission system V in which the pulleys T and T are rotatable in both of the forward and reverse directions.

Second Embodiment

Figure 5:
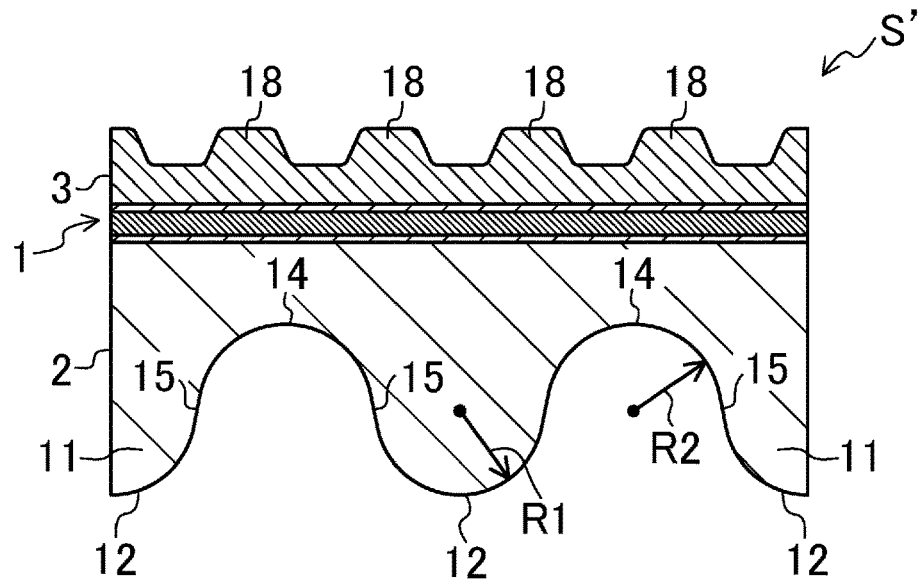
FIG. 5 is a view corresponding to FIG. 2, illustrating a second embodiment.

FIG. 5 illustrates a belt S' according to a second embodiment. In FIG. 5, the same reference characters are used to designate identical or similar elements to those in FIGS. 1 and 2, and the detailed explanation thereof will be omitted.

As illustrated in FIG. 5, according to the present embodiment, the outer peripheral surface (the upper surface in FIG. 5) of the extension portion 3 is provided with a plurality of outer cogs 18, 18, ..., which are linearly extending ridges extending in the belt width direction and protruding toward the belt outer peripheral side. The shape of each outer cog 18 or pitches of the outer cogs 18, 18 can be freely determined or may be configured similarly to the cogs 11 on the inner peripheral side. That is: a groove, which is an indentation recessed in an opposite direction to the protruding direction of the outer cog 18, may be formed between adjacent outer cogs 18; both of a tip portion in the protruding direction of each outer cog 18 and a bottom portion of each groove may have curved surfaces each having an arc-shaped cross section; and the curvature radius of a cross sectional shape of the bottom portion of the groove may be larger than the curvature radius of a cross sectional shape of the tip portion of the cog. The other configurations are the same as those of the first embodiment.

In this embodiment, too, similar advantages to those of the above embodiment can be obtained. Further, the outer cogs 18, 18, ..., contribute to a further increase in the area which receives the pressure from the sidewalls 23 of the pulley grooves 21, which further ensures the belt rigidity against such pressure.

Other Embodiments

In the first and second embodiments, the tip portion 12 of the cog 11 and the bottom portion 14 of the groove 13 adjacent to the cog 11 are connected via the planar surface 15. However, the configurations are not limited thereto. The tip portion 12 of the cog 11 and the bottom portion 14 of the groove 13 may be directly connected.

In the first embodiment, the cogs 11, 11, ..., are formed only in the inner peripheral surface of the belt S, whereas in the second embodiment, the cogs 11, 11, ..., are formed in the inner peripheral surface of the belt S, and the outer cogs 18, 18, ..., are formed in the outer peripheral surface of the belt S. However, the configurations are not limited thereto. Only the outer peripheral surface of the belt S may be cogged to have a plurality of cogs extending in the belt width direction and arranged adjacent to one another at regular intervals in the belt length direction, wherein: a groove, which is an indentation recessed in an opposite direction to the protruding direction of the cog, may be formed between adjacent cogs; both of a tip portion in the protruding direction of each cog and a bottom portion of each groove may have curved surfaces each having an arc-shaped cross section; and the curvature radius of a cross sectional shape of the bottom portion of the groove may be larger than the curvature radius of a cross sectional shape of the tip portion of the cog.

In the first embodiment, the power transmission system is comprised of two pulleys T and T and the belt S wrapped around the pulleys T and T. However, the configurations are not limited thereto. The power transmission system may be comprised of three or more pulleys T, T and a belt S wrapped around the three or more pulleys T, T.

EXAMPLES

Specific examples of one or more embodiments will be described below.

Examples 1 to 4

Figure 8:
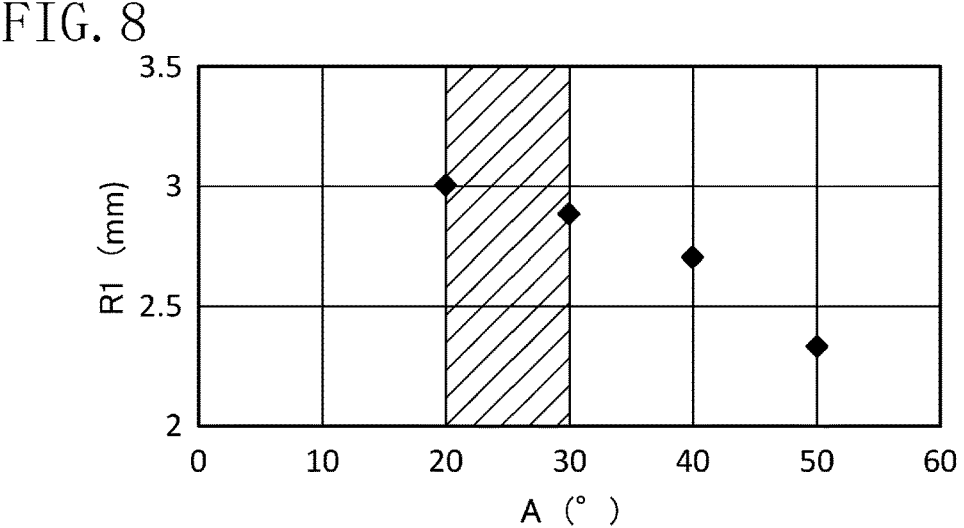
FIG. 8 is a graph showing a relationship between a radius of a tip portion of the cog and an intersection angle formed between planar surfaces connecting the tip portions of the cogs with a groove therebetween.

With respect to cogged belts S having configurations similar to the configuration of the cogged belt S of the first embodiment (in which the thickness of the belt was 15 mm, the depth of the groove 13 between the cogs 11 and 11 was 6 mm, and the pitch between the cogs 11 and 11 was 13 mm), the curvature radius R1 of the cross sectional shape of the tip portion 12 of the cog was changed while fixing the curvature radius R2 of the cross sectional shape of the bottom portion 14 of the groove at 3.5 mm. FIG. 8 shows a relationship between the radius R1 and the intersection angle A between the planar surfaces 15 and 15. Note that the intersection angle A was set to be 20° or greater in consideration of the structure of the cogged belt S. Subsequently, the following analysis was carried out.

<Belt Rigidity Analysis>

Figure 6:
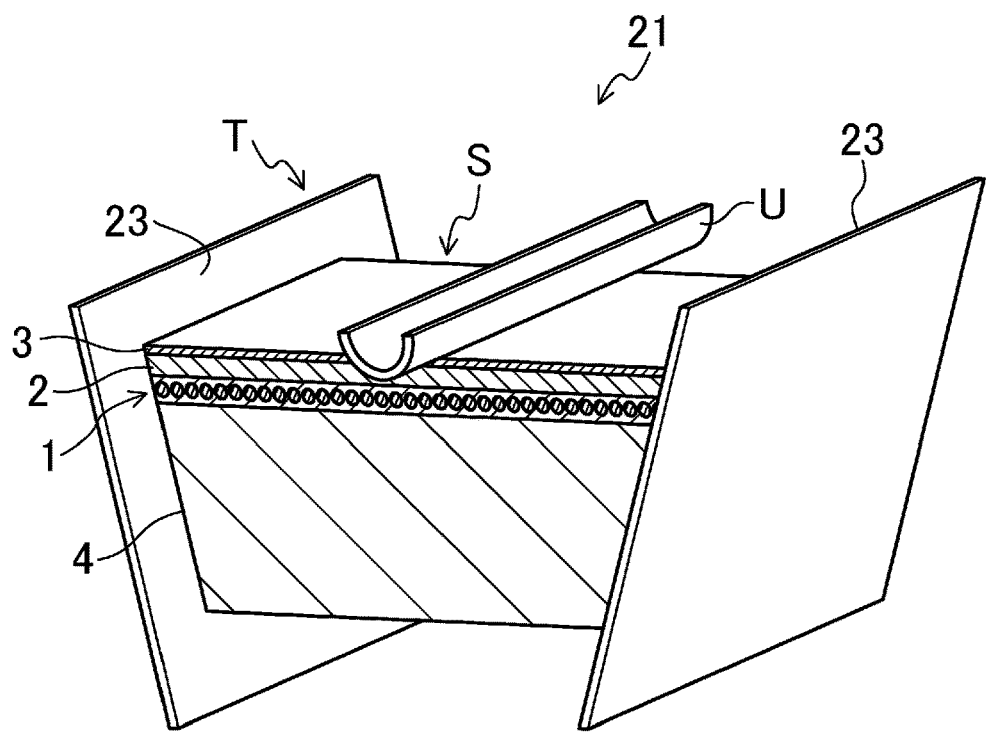
FIG. 6 is a schematic diagram illustrating an analysis model for obtaining the rigidity of belts of Examples.
Figure 9:
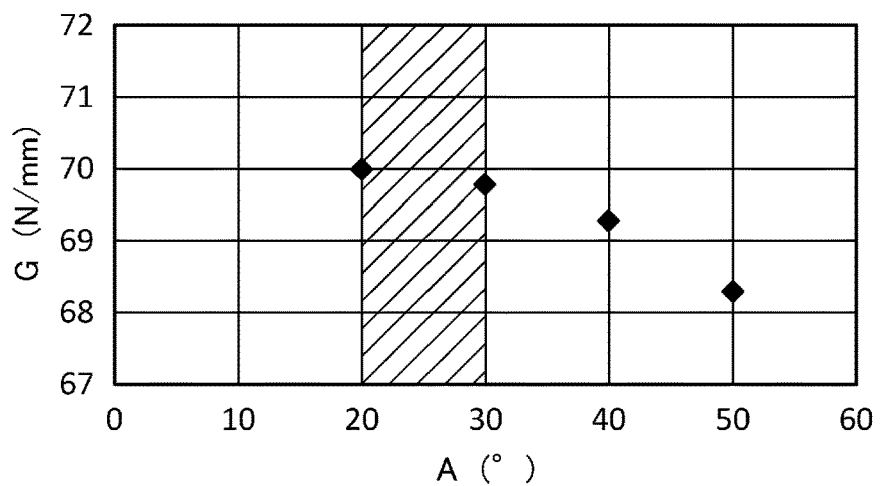
FIG. 9 is a graph showing a relationship between the belt rigidity and the intersection angle formed between the planar surfaces connecting the tip portions of the cogs with the groove therebetween.

An analysis for obtaining the rigidity G (unit: N/mm) of each belt S was carried out by a finite element method (FEM). Specifically, as illustrated in FIG. 6, each of the belts S having the different intersection angles A was fitted in the pulley groove 21 of the pulley T, which is a V-shaped pulley, and a middle portion, in the width direction, of the outer peripheral surface of each belt S was pressed by a holding rod U (shown in cut-in-half view in FIG. 6) extending in the belt length direction, and the rigidity G of the belt S was obtained from the reaction force and the deflection amount of the belt S generated while the belt S was in this three-point bending state. The analysis results are shown in FIG. 9.

The analysis was modeled by setting, as analysis conditions, the effective diameter of the pulley T to be 405 mm, the V-shaped groove angle of the pulley groove 21 to be 26°, and the diameter of the holding rod U to be 10 mm, and using a hexahedral element as the belt S, and rigid bodies as the pulley T and the holding rod U.

(Bending Resistance Analysis)

Figure 7:
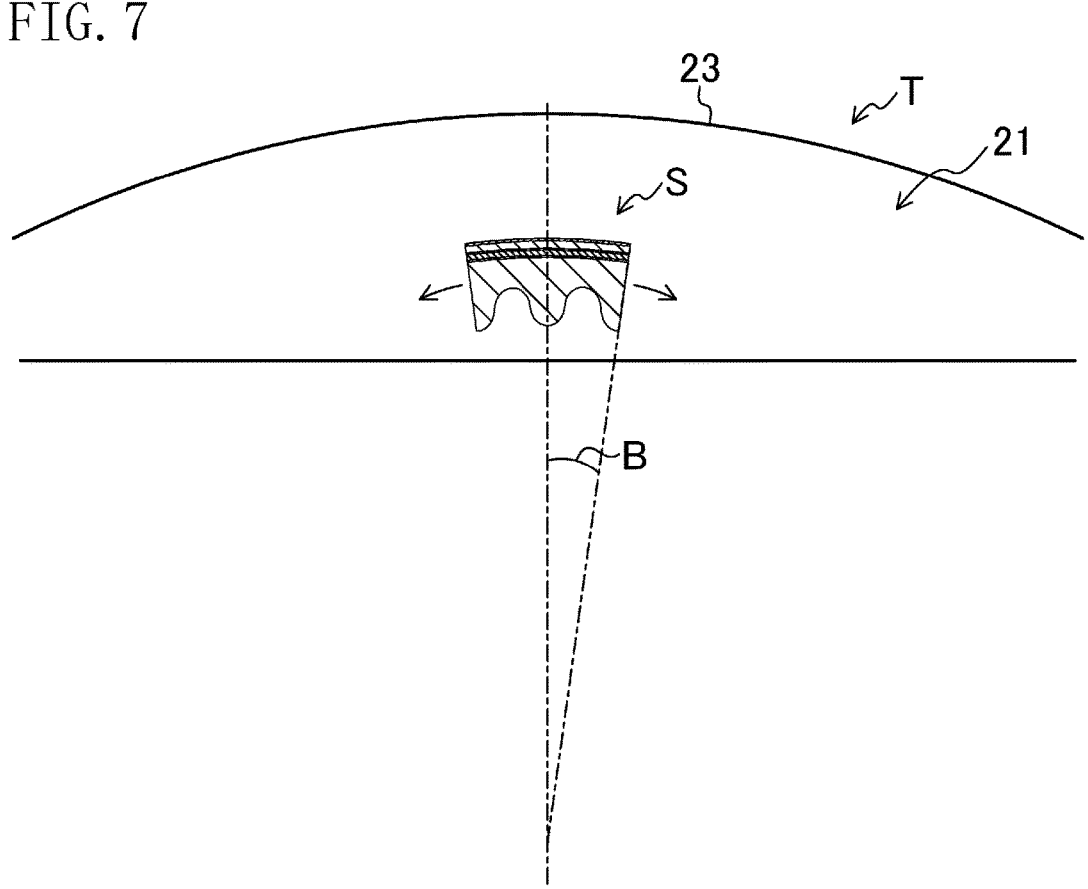
FIG. 7 is a schematic diagram illustrating an analysis model for obtaining the bending resistance of the belts.

An FEM analysis for obtaining the bending resistance M (unit: N·mm) of each belt S was carried out. Specifically, as illustrated in FIG. 7, each of the belts S having the different intersection angles A was fitted in the pulley groove 21 of the pulley T, and the bending resistance M when the belt S was wrapped around the pulley T while a predetermined tension was applied to the belt S in the belt length directions was obtained. The analysis results are shown in FIG. 10.

The analysis was modeled by setting, as analysis conditions, the effective diameter of the pulley T to be 405 mm, the V-shaped groove angle of the pulley groove 21 to be 26°, the belt tension to be 350 N, and a belt wrapping angle B per pitch of the cogs 11 to be 0.0566 rad, and using a hexahedral element as the belt S, and rigid bodies as the pulley T and the holding rod U.

(Analysis Results)

Figure 10:
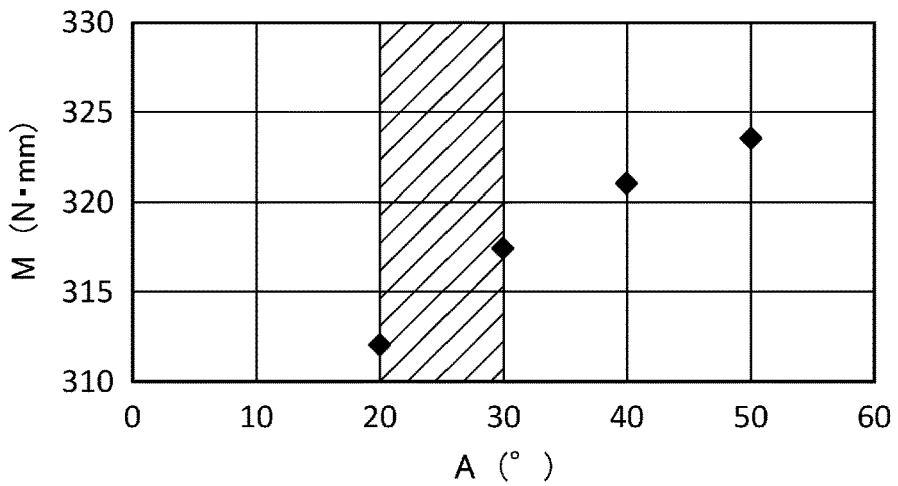
FIG. 10 is a graph showing a relationship between the bending resistance of the belts and the intersection angle formed between the planar surfaces connecting the tip portions of the cogs with the groove therebetween.

As shown in FIGS. 9 and 10, in a case of Example 1 in which the intersection angle A is 20° (A=20°), the analysis results are as follows: R1=3.0 mm; the belt rigidity G=70 N/mm; and the bending resistance M=312 N·mm.

In a case of Example 2 in which the intersection angle A is 30° (A=30°), the analysis results are as follows: R1=2.88 mm; the belt rigidity G=69.8 N/mm; and the bending resistance M=317.5 N·mm.

In a case of Example 3 in which the intersection angle A is 40° (A=40°), the analysis results are as follows: R1=2.7 mm; the belt rigidity G=69.3 N/mm; and the bending resistance M=321 N·mm.

In a case of Example 4 in which the intersection angle A is 50° (A=50°), the analysis results are as follows: R1=2.33 mm; the belt rigidity G=68.3 N/mm; and the bending resistance M=323.5 N·mm.

Comparative Example

An analysis similar to the analysis described above was carried out on a conventional cogged belt in which the radius R1 of the tip portion 12 of a cog is larger than the radius R2 of the bottom portion 14 of the groove (R1=3.0 mm and R2=1.5 mm). The results were that the belt rigidity was 103 N/mm and the bending resistance was 790 N·mm.

(Study of Analysis Results)

The bending resistance of each of Examples 1 to 4 is about 40% of the bending resistance of Comparative Example. On the other hand, the belt rigidity of each of Examples 1 to 4 is about 65% of the belt rigidity of the Comparative Example. This means that the bending resistance can be reduced without excessive reduction in the belt rigidity. It is clear from these results that according to one or more embodiments, the bendability of a belt can be increased while maintaining the rigidity of the belt.

As shown in FIG. 8, a greater intersection angle A results in a smaller radius R1 and a smaller area of the belt side surfaces. The belt rigidity G decreases accordingly, as shown in FIG. 9. On the other hand, a greater intersection angle A results in a greater bending resistance M, as shown in FIG. 10.

Thus, the intersection angle A is preferably in a range between 20° and 30° to ensure the bendability of a belt while reducing a reduction in the rigidity of the belt.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A cogged V-belt, an inner peripheral surface of which is cogged to have a plurality of cogs extending in a belt width direction and arranged adjacent to one another at regular intervals in a belt length direction, wherein
   a groove is formed between the cogs adjacent to each other, the groove being recessed in an opposite direction to a protruding direction of the cogs,
   a tip portion in the protruding direction of the cog and a bottom portion of the groove have curved surfaces each having an arc-shaped cross section,
   a curvature radius of a cross-sectional shape of the bottom portion of the groove is larger than a curvature radius of a cross-sectional shape of the tip portion of the cog,
   the cogged V-belt includes a cord buried portion in which a cord is buried, and a compressed portion provided on a side of the cord buried portion toward the inner peripheral surface,
   the compressed portion has the cogs and the groove:
   the tip portions of the cogs are connected with the bottom portion of the groove between the cogs via planar surfaces located between the respective tip portions of the cogs and the bottom portion of the groove, and
   an intersection angle between the planar surfaces on both sides of the groove is 20° or more and 30° or less.

2. The cogged V-belt of claim 1, wherein
   each of the cogs is formed so as to be plane-symmetrical to a symmetry plane that is perpendicular to the belt length direction and passes through a middle portion in a thickness direction of the cog.

3. The cogged V-belt of claim 1, wherein
the cord buried portion includes an adhesive rubber layer made of a rubber composition, and
the compressed portion is made of a rubber composition.

4. A power transmission system in which the cogged V-belt of claim 1 is wrapped around a plurality of pulleys.

* * * * *